(12) United States Patent
Traylor

(10) Patent No.: US 10,583,880 B2
(45) Date of Patent: Mar. 10, 2020

(54) SKATE TRUCK ASSEMBLIES AND ASSOCIATED METHODS FOR REAR SUSPENSION SPRING COMPRESSION

(71) Applicant: Toyota Motor Engineering & Manufacturing North America, Inc., Erlanger, KY (US)

(72) Inventor: Brian W. Traylor, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 239 days.

(21) Appl. No.: 15/802,119

(22) Filed: Nov. 2, 2017

(65) Prior Publication Data
US 2019/0127001 A1 May 2, 2019

(51) Int. Cl.
*B62D 65/12* (2006.01)

(52) U.S. Cl.
CPC .......... *B62D 65/12* (2013.01); *B60G 2200/10* (2013.01); *B60G 2202/12* (2013.01)

(58) Field of Classification Search
CPC ...... B60G 2206/92; B60G 7/00; B60G 11/14; A63C 17/015
See application file for complete search history.

(56) References Cited

U.S. PATENT DOCUMENTS

| 5,915,707 A  * | 6/1999  | Steffen         | A63C 17/0026 280/87.01 |
| 6,793,224 B2 * | 9/2004  | Stratton        | A63C 17/01 280/87.041 |
| 7,243,925 B2 * | 7/2007  | Lukoszek        | A63C 17/0093 280/11.28 |
| 7,708,289 B2 * | 5/2010  | Jaime, Sr.      | A63C 17/26 280/11.203 |
| 8,328,206 B2 * | 12/2012 | Williams, Jr.   | A63C 17/0093 280/11.27 |
| 8,783,699 B2 * | 7/2014  | Gesmer          | A63C 17/012 280/87.042 |

(Continued)

FOREIGN PATENT DOCUMENTS

DE    10137133 B4    1/2012
JP    4862561 B2     1/2012

(Continued)

*Primary Examiner* — John D Walters
*Assistant Examiner* — James J Triggs
(74) *Attorney, Agent, or Firm* — Dinsmore & Shohl LLP

(57) ABSTRACT

A skate truck assembly that engages a lower rear suspension arm during assembly may include a base comprising a track that extends linearly in a translation direction and an articulating truck assembly slidably coupled to the track, the articulating truck assembly being moveable along the track in the translation direction. The articulating truck assembly may include a track receiving carriage that slidingly receives the track and a suspension arm engagement structure having an elongated, longitudinal axis. The suspension arm engagement structure may be operatively connected to the track receiving carriage. The suspension arm engagement structure may rotate relative to the track receiving carriage along a first axis of rotation that is perpendicular to the longitudinal axis of the suspension arm engagement structure.

20 Claims, 6 Drawing Sheets

(56) References Cited

U.S. PATENT DOCUMENTS

| | | | |
|---|---|---|---|
| 9,375,633 B2* | 6/2016 | Carlson | A63C 17/017 |
| 9,573,045 B2* | 2/2017 | Lai | A63C 17/16 |
| 9,789,412 B2* | 10/2017 | Mainville | A63C 17/12 |
| 9,878,230 B1* | 1/2018 | Seele | A63C 17/26 |
| 2010/0301572 A1* | 12/2010 | Newton | A63C 17/006 |
| | | | 280/11.27 |

FOREIGN PATENT DOCUMENTS

| | | | |
|---|---|---|---|
| JP | 5800236 B2 | 10/2015 | |
| WO | 201463936 A1 | 5/2014 | |
| WO | 2014063685 A1 | 5/2014 | |

\* cited by examiner

US 10,583,880 B2

SKATE TRUCK ASSEMBLIES AND ASSOCIATED METHODS FOR REAR SUSPENSION SPRING COMPRESSION

TECHNICAL FIELD

The present specification generally relates to apparatuses and methods for affixing suspension components to a vehicle and, more specifically, to skate truck assemblies and associated methods for compressing rear suspension springs and coupling lower rear suspension arms to rear suspensions.

BACKGROUND

Vehicles are generally assembled along a production line using a number of assembly mechanisms to piece together various pre-fabricated components. For example, one component of a vehicle that must be assembled is the rear suspension. Current mechanisms for installing rear suspensions may require removal and reinstallation of one or more assembly components each time a rear suspension assembly is installed and assembled on the successive vehicles on an assembly line. For example, assembly mechanisms that compress rear suspension springs and lift a lower rear suspension arm to a ride height may include one or more components that must be removed from an assembly mechanism as each vehicle passes along the assembly line. The reinstallation of assembly mechanism components may add to overall assembly times driving down efficiency and overall productivity. Accordingly, a need exists for skate truck assemblies for compressing rear suspension springs and coupling lower rear suspension arms to rear suspensions.

SUMMARY

In one embodiment, a skate truck assembly that engages a lower rear suspension arm during assembly may include a base comprising a track that extends linearly in a translation direction and an articulating truck assembly slidably coupled to the track, the articulating truck assembly being moveable along the track in the translation direction. The articulating truck assembly may include a track receiving carriage that slidingly receives the track and a suspension arm engagement structure having an elongated, longitudinal axis. The suspension arm engagement structure may be operatively connected to the track receiving carriage. The suspension arm engagement structure may rotate relative to the track receiving carriage along a first axis of rotation that is perpendicular to the longitudinal axis of the suspension arm engagement structure.

In another embodiment, a vehicle having a lower rear suspension may be configured to be engaged by a skate truck assembly. The skate truck assembly may include a base comprising a track that extends linearly in a translation direction and an articulating truck assembly slidably coupled to the track, the articulating truck assembly being moveable along the track in the translation direction. The articulating truck assembly may include a track receiving carriage that slidingly receives the track and a suspension arm engagement structure having an elongated, longitudinal axis. The suspension arm engagement structure may be operatively connected to the track receiving carriage. The suspension arm engagement structure may rotate relative to the track receiving carriage along a first axis of rotation that is perpendicular to the longitudinal axis of the suspension arm engagement structure.

In yet another embodiment, a method of installing a lower rear suspension arm on a vehicle using an articulating truck assembly may include moving the articulating truck assembly along a track in a translation direction. The articulating truck assembly may comprise a track receiving carriage that slidingly receives the track, a suspension arm engagement structure operatively connected to the track receiving carriage that comprises a longitudinal axis. The method may further comprise pivoting the suspension arm engagement structure about a first axis of rotation that is perpendicular to the longitudinal axis of the suspension arm engagement structure to engage the lower rear suspension arm.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
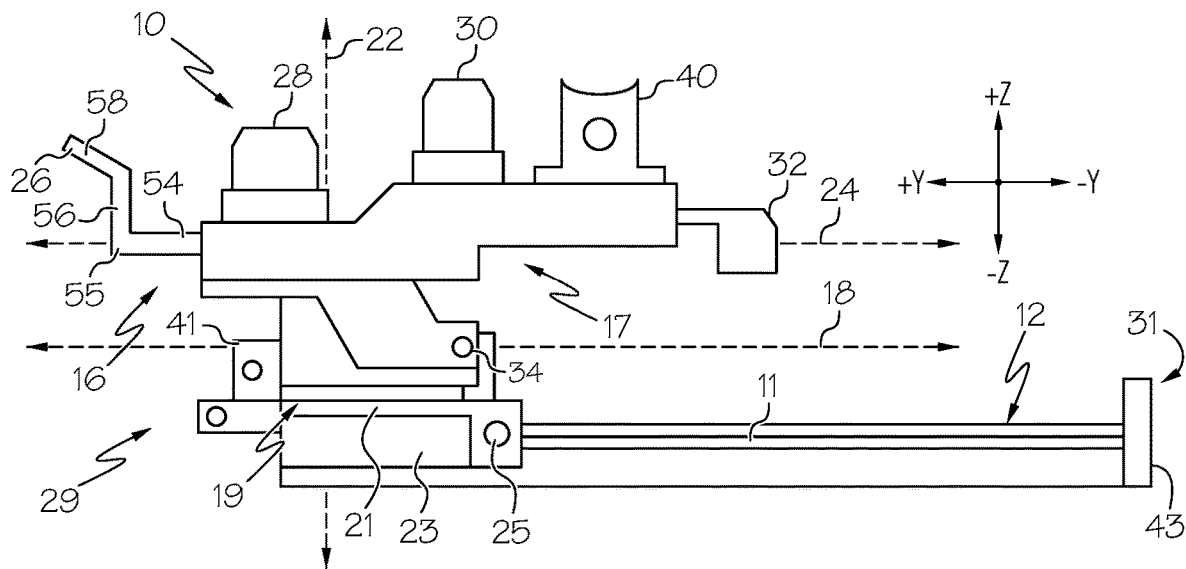
FIG. 1A schematically depicts a side view of a skate truck assembly for installing a lower rear suspension arm to the rear suspension of a vehicle, according to one or more embodiments shown and described herein.

Some vehicles may include a lower rear suspension arm that is installed on the rear suspension of a vehicle using two bolts connecting opposite ends of the lower rear suspension arm to the rear suspension. The lower rear suspension arm may be coupled to the rear suspension at a first end of the lower rear suspension arm, a suspension spring or other damping mechanism may be installed between the rear suspension and the lower rear suspension arm, and the lower rear suspension arm may be pivoted upward to a vehicle ride height, compressing the suspension spring between the rear suspension and the lower rear suspension arm. The outboard end of the lower rear suspension arm may then be bolted or otherwise coupled to the outboard end of the rear suspension.

In vehicles using such methods to connect lower rear suspension arms, the second end of the lower rear suspension arm may swing outward from the vehicle centerline as the suspension spring is compressed to the point where the second, outboard end of the lower rear suspension arm can be coupled to the appropriate location on the outboard portion of the rear suspension.

In some current mechanisms for installing lower rear suspension arms, a removable coupler having one or more rollers is temporarily coupled to the lower rear suspension arm between the lower rear suspension arm and a lifting platform to enable sliding motion between the outboard end of the lower rear suspension arm and the lifting platform. The lifting platform may be a flat metal piece that is forced upward by a hydraulic or pneumatic cylinder. The lifting platform pushes the lower rear suspension arm into place so that a bolt can be installed at the second outboard coupling of the lower rear suspension arm and the lower rear suspension arm can be permanently fixed to the lower rear suspension.

As the lifting platform pushes upward, the lower rear suspension arm swings outboard and upward and the rollers of the removable coupler roll in the vehicle outboard direction along the lifting platform with the outboard end of the lower rear suspension arm. Without the removable coupler and rollers or some other mechanism, the lifting platform may be unsuitable for installing the lower rear suspension arm.

Because the one or more rollers of the temporary coupler are not fixedly coupled to the lifting platform, there is a possibility that the force of the lifting platform and counter force of the rear suspension spring could force the rollers out of alignment between the lower rear suspension arm and the lifting platform. Misalignment between the lower rear suspension arm and the lifting platform may cause the temporary coupler to disengage the lower rear suspension arm or the platform. To prevent erratic motion of the temporary coupler during compression of the suspension spring, new mechanisms and methods are required. Accordingly, a skate truck having a fixed, retractable, and articulable skate truck assembly is required.

FIGS. 1A-5 shown and described herein each refer to the vehicle-right side of the lower rear suspension assembly and hence are described from that point of view. As such, reference may be made to the vehicle inward direction or to a vehicle centerline, and in general, that means to the left as facing the rear of the vehicle looking forward along the longitudinal length of the vehicle. However, it should be understood that the left side of the vehicle rear suspension can be assembled in a similar or mirrored fashion. Additionally, with reference to the coordinate axes in FIG. 1C, the +X-direction is generally forward in the vehicle longitudinal direction (with reference to a vehicle being assembled on the assembly line). The +Y-direction is toward a vehicle center line (or in the vehicle left direction when describing the construction of the right side of a vehicle, as is the case here). The +Z-direction is toward the top of the vehicle.

Figure 4:
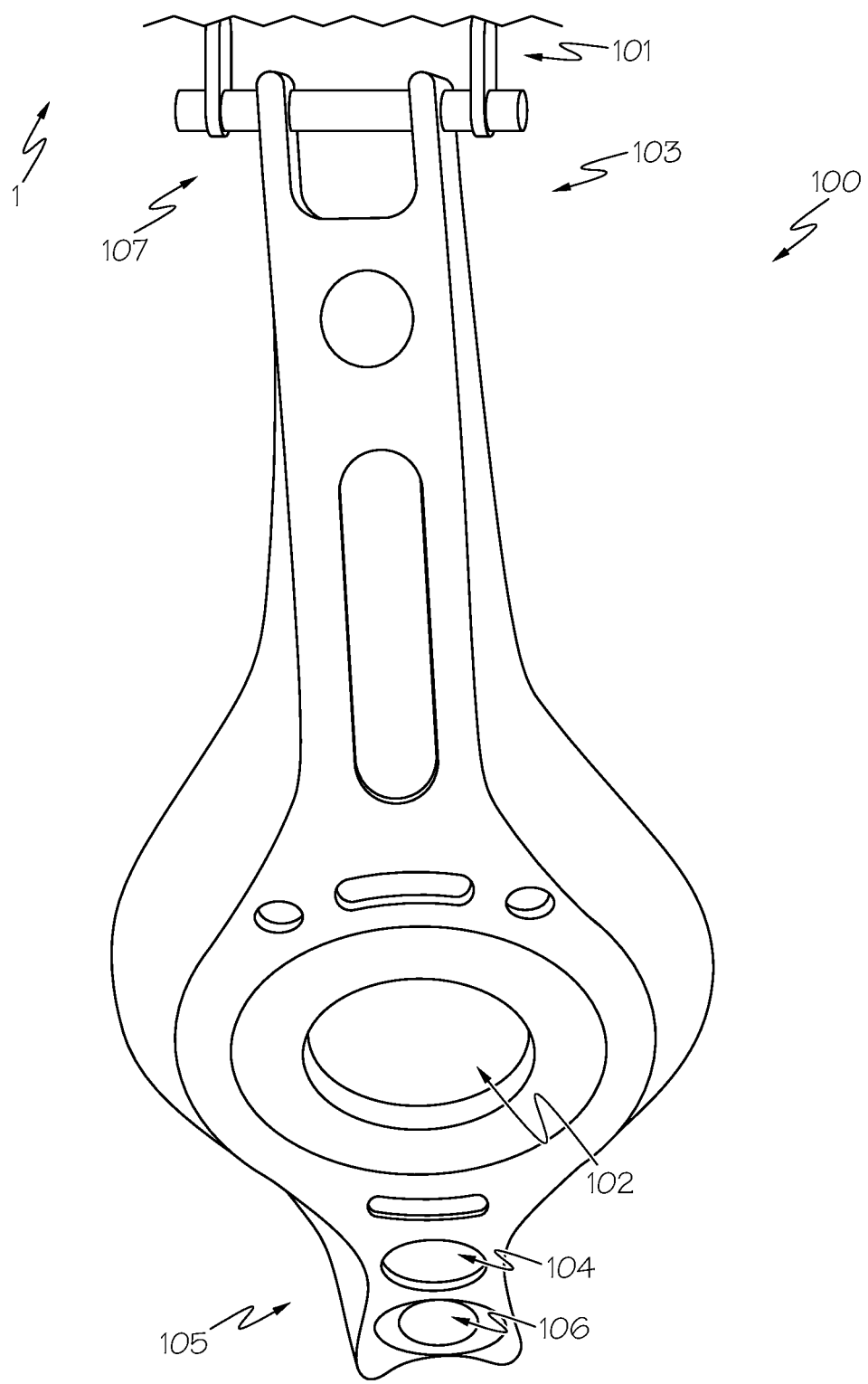
FIG. 4 schematically depicts a lower rear suspension arm for attachment to the rear suspension of a vehicle, according to one or more embodiments shown and described herein.
Figure 5:
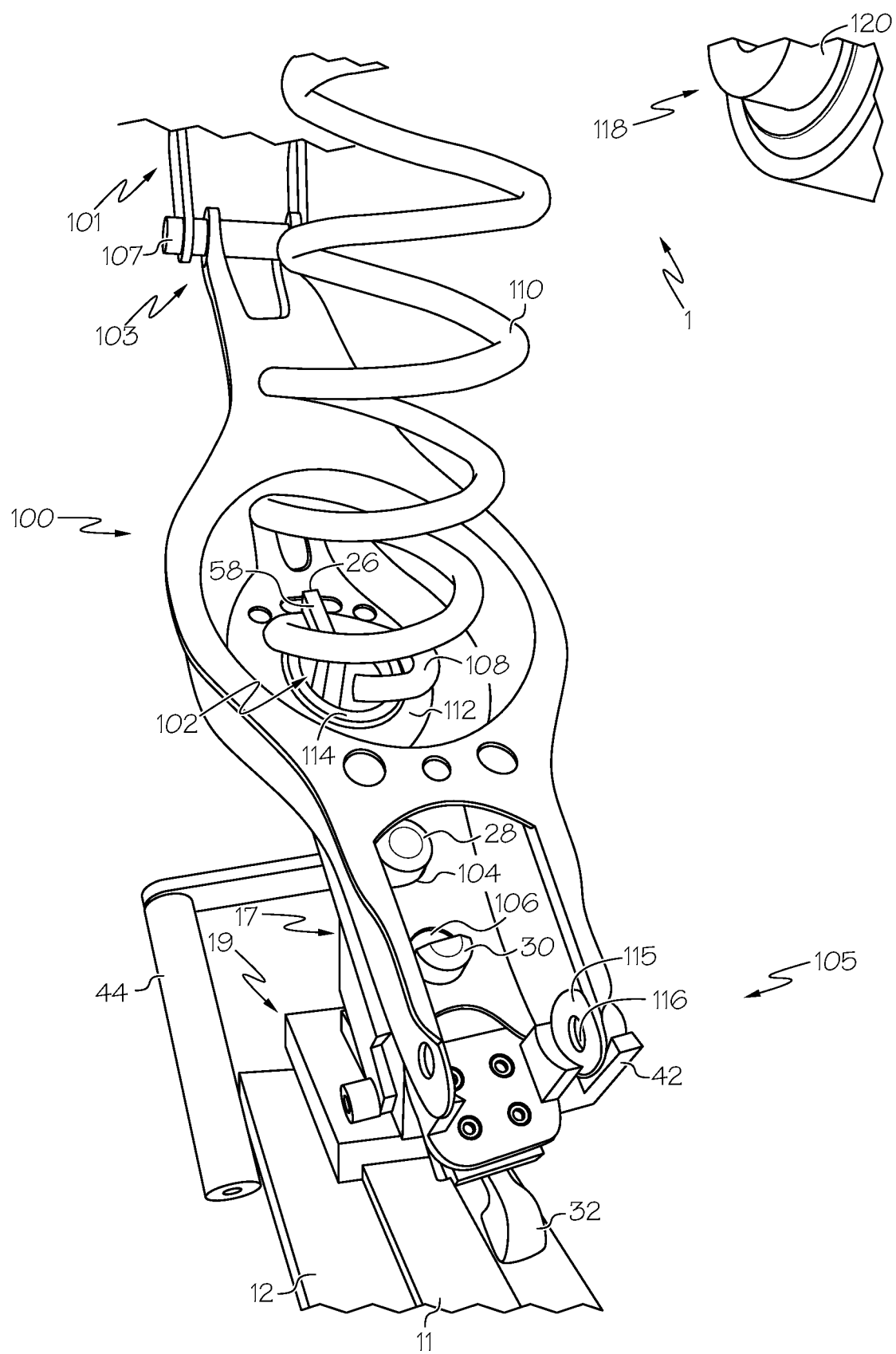
FIG. 5 schematically depicts the skate truck assembly of FIG. 1A, the lower rear suspension arm of FIG. 4, and a suspension spring, according to one or more embodiments shown and described herein.

FIG. 4 shows an exemplary lower rear suspension arm 100 of a rear suspension 101 of a vehicle 1 in isolation from below the vehicle 1. FIGS. 4 and 5 show the lower rear suspension arm 100 connected to a frame of the vehicle 1 at the rear suspension 101. When installation is complete, an inboard end 103 of the lower rear suspension arm 100 is pivotably coupled to a pivot joint 107 that joins the frame with the lower rear suspension arm 100 and to an outboard bolt location 118 (FIG. 5) on a wheel hub at an outboard end 105 of the lower rear suspension arm 100. The lower rear suspension arm 100 may comprise a main opening 102, an inboard datum pin opening 104, and an outboard datum pin opening 106.

FIG. 5 shows the lower rear suspension arm 100 being installed on the vehicle 1. A suspension spring 110 is positioned between the lower rear suspension arm 100 and the rear suspension 101 of the vehicle 1. A bottom coil 108 of the suspension spring 110 surrounds the main opening 102 and contacts the lower rear suspension arm 100 at an inside surface 112 of the lower rear suspension arm 100. A gasket 114 may be placed between the inside surface 112 of the lower rear suspension arm 100 and the bottom coil 108 of the suspension spring 110. The suspension spring 110 may be compressed by forcing the lower rear suspension arm 100 upward at the outboard end 105 by rotating the lower rear suspension arm 100 about the pivot joint 107 until the outboard end 105 is fixed at the outboard bolt location 118 to a wheel hub or other portion of the vehicle 1.

Figure 1B:
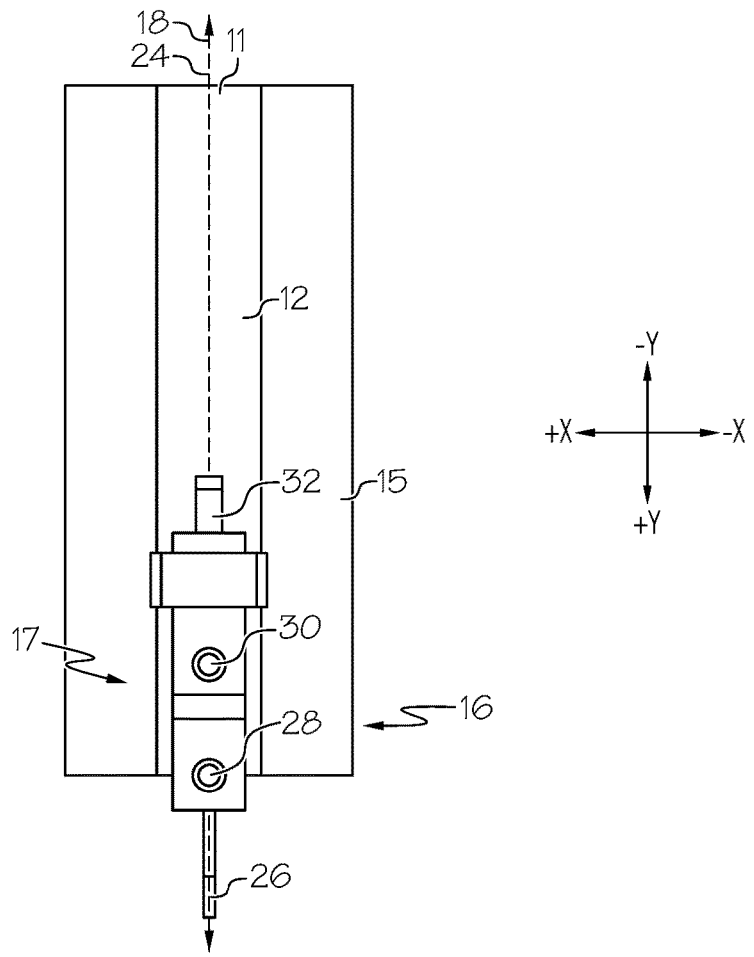
FIG. 1B schematically depicts a top view of the skate truck assembly of FIG. 1A, according to one or more embodiments shown and described herein.
Figure 1C:
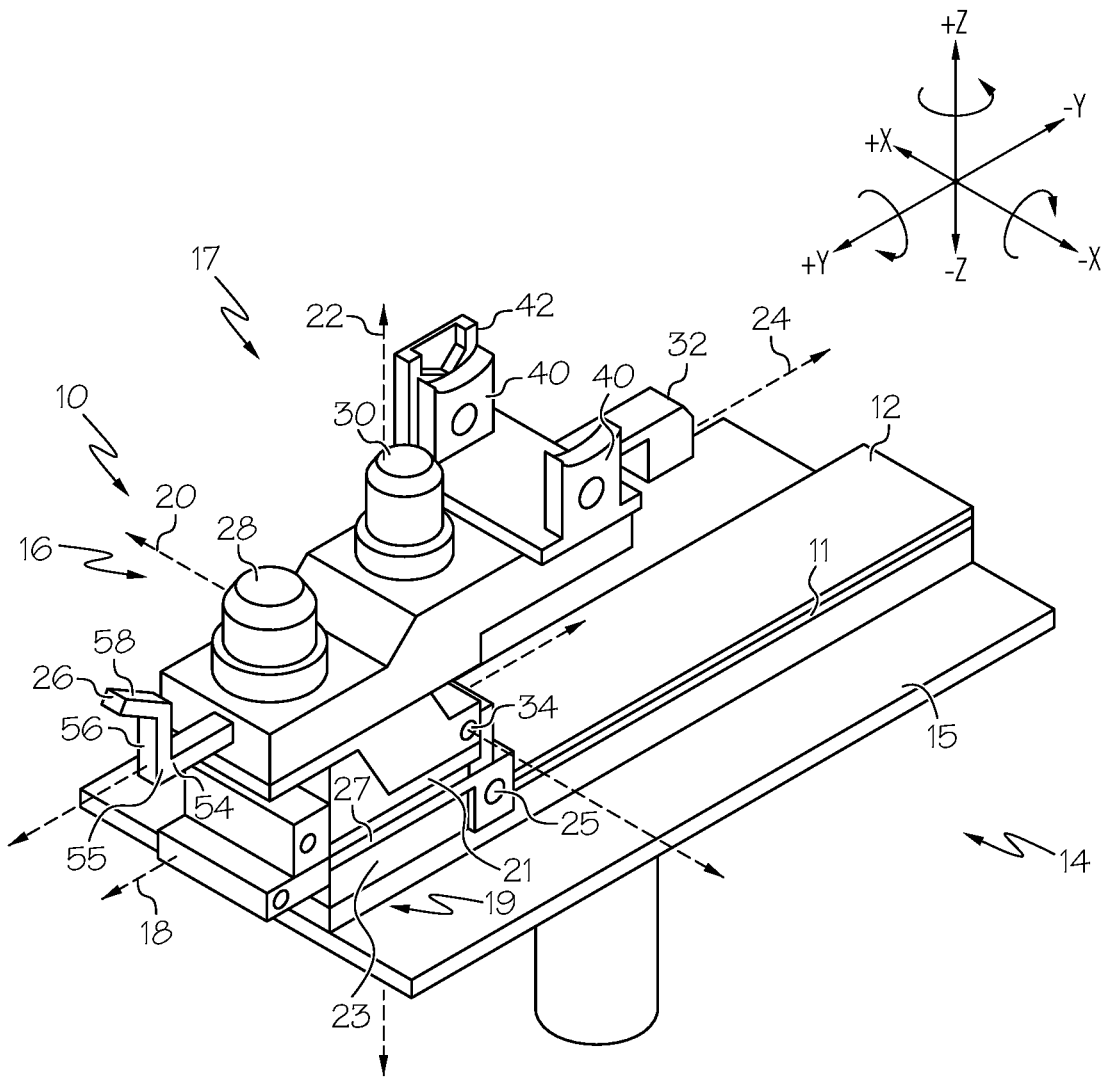
FIG. 1C schematically depicts an isometric view of the skate truck assembly of FIG. 1A and a lift machine for lifting the skate truck assembly, according to one or more embodiments shown and described herein.

Referring now to FIGS. 1A-1C, a skate truck assembly 10 is shown. The skate truck assembly 10 may be used to handle the lower rear suspension arm 100 to at least partially assemble the rear suspension 101 of the vehicle 1. The skate truck assembly 10 includes a base 12 that is permanently fixed to a platform 15 (FIG. 1C) of a lift machine 14 (FIG. 1C) and an articulating truck assembly 16 that can translate back and forth, toward and away from a vehicle, in a translation direction (+/−Y-direction) along a track 11 of the base 12 and also has one or more axes of rotation that are orthogonal to the translation direction and one another as will be described in greater detail below. The base 12 may be fixed to the platform 15 via any suitable method such as one or more fasteners through the base 12 and the platform 15.

FIGS. 1B and 1C show the platform 15 of the lift machine 14. The platform 15 may move along (i.e., translate in) the X-axis and the Z-axis. For example, the platform 15 may be on a dolly or other hydraulically or pneumatically actuated lifting device. The base 12 is coupled to the platform 15, and thus, the base 12 is translatable with the platform 15 in the +/−X- and +/−Z-directions. Translation of the base 12 can enable the articulating truck assembly 16 to be positioned at the proper height and at the proper location in the vehicle longitudinal direction to install the lower rear suspension arm 100.

The articulating truck assembly 16 may comprise a suspension arm engagement structure 17 and a lower portion 19. The lower portion 19 may comprise an intermediate support member 21, a track receiving carriage 23, and a slide bearing 25. The lower portion 19 may be slidably coupled to the base 12 along the track 11 by the track receiving carriage 23 such that the articulating truck assembly 16 can slide in the translation direction (+/−Y-direction). Referring to FIG. 1A, the slide bearing 25 may slidably couple the track 11 and the track receiving carriage 23 at portions of the track receiving carriage 23 straddle the track 11. The track receiving carriage 23 is fixed such that it only translates along the track 11 and therefore only translates in the translation direction (+/−Y-direction). The track 11 may comprise an inboard end 29 and an outboard end 31 and have an inboard stop 41 and an outboard stop 43 to limit the sliding motion of the articulating truck assembly 16 toward and away from a vehicle.

The intermediate support member 21 and the track receiving carriage 23 may be rotatably coupled such that the intermediate support member 21 can rotate with respect to the track receiving carriage 23 about the an axis of rotation as will be described in greater detail below.

The suspension arm engagement structure 17 may comprise a finger 26, an inboard datum pin 28, an outboard datum pin 30, and an alignment nose 32. The finger 26, the inboard datum pin 28, and the outboard datum pin 30 may be substantially aligned along a longitudinal axis 24 of the suspension arm engagement structure 17 (FIG. 1B). Additionally, with brief reference to FIGS. 4 and 5, the finger 26, inboard datum pin 28, and outboard datum pin 30 may correspond with the main opening 102, the inboard datum pin opening 104, and the outboard datum pin opening 106 of the lower rear suspension arm 100, respectively. The finger 26, inboard datum pin 28, and outboard datum pin 30 may project into their respective openings of the lower rear suspension arm 100 when the lower rear suspension arm 100 and the suspension spring 110 are being installed. The finger 26, inboard datum pin 28, and outboard datum pin 30 may provide points of contact to keep the lower rear suspension arm 100 in proper alignment as the suspension spring 110 is compressed by the lifting force of the lift machine 14.

Referring back to FIGS. 1A-1C, the finger 26 may generally extend inboard and upward from the articulating truck assembly 16. The finger 26 may be a separate, detachable piece bolted to the inboard side of the articulating truck assembly 16 or it may be integral and monolithic with the articulating truck assembly 16. The finger 26 may comprise a horizontal portion 54, a vertical portion 56, and a hook 58. The horizontal portion 54 may connect to the vertical portion 56 at a forward end that comprises a corner 55. Briefly referring to FIG. 5, the hook 58 may extend into the main opening 102 of the lower rear suspension arm 100 with sufficient clearance to cover the bottom coil 108 of the suspension spring 110 to prevent the suspension spring 110 from coming off of alignment with the gasket 114 on the inside surface 112 of the lower rear suspension arm 100 when the suspension spring 110 is compressed.

The inboard datum pin 28 extends upward from the suspension arm engagement structure 17 of the articulating truck assembly 16. The inboard datum pin 28 may be sized to fit within the inboard datum pin opening 104 of the lower rear suspension arm 100. The inboard datum pin 28 may include a bevel at the top to guide the inboard datum pin 28 into the inboard datum pin opening 104 when the articulating truck assembly 16 is placed in position for installing the lower rear suspension arm 100. In some embodiments, the inboard datum pin 28 includes a slot 39 (FIG. 2) through at least a portion of the diameter of the inboard datum pin 28 that permits slight inward compression of opposite hemispheres of the inboard datum pin 28 in case the inboard datum pin 28 is seized within the inboard datum pin opening 104 of the lower rear suspension arm 100.

The outboard datum pin 30 extends upward from the suspension arm engagement structure 17 of the articulating truck assembly 16. The outboard datum pin 30 is sized to fit within the outboard datum pin opening 106 of the lower rear suspension arm 100. The outboard datum pin 30 may include a bevel at the top to guide the outboard datum pin 30 into the outboard datum pin opening 106 when the articulating truck assembly 16 is placed in position for installing the lower rear suspension arm 100. In some embodiments, the outboard datum pin 30 may include a slot, similar to the slot 39 in the inboard datum pin 28, that passes through at least a portion of the diameter of the outboard datum pin 30 to permit slight inward compression of opposite hemispheres of the outboard datum pin 30 in case the outboard datum pin 30 is seized within the outboard datum pin opening 106 of the lower rear suspension arm 100.

The alignment nose 32 extends rearward from the suspension arm engagement structure 17 and may be shaped help align the suspension arm engagement structure 17 as it is raised by the lift machine 14 by preventing the articulating truck assembly 16 from translating in the vehicle longitudinal direction as the suspension spring 110 is squeezed.

Figure 2:
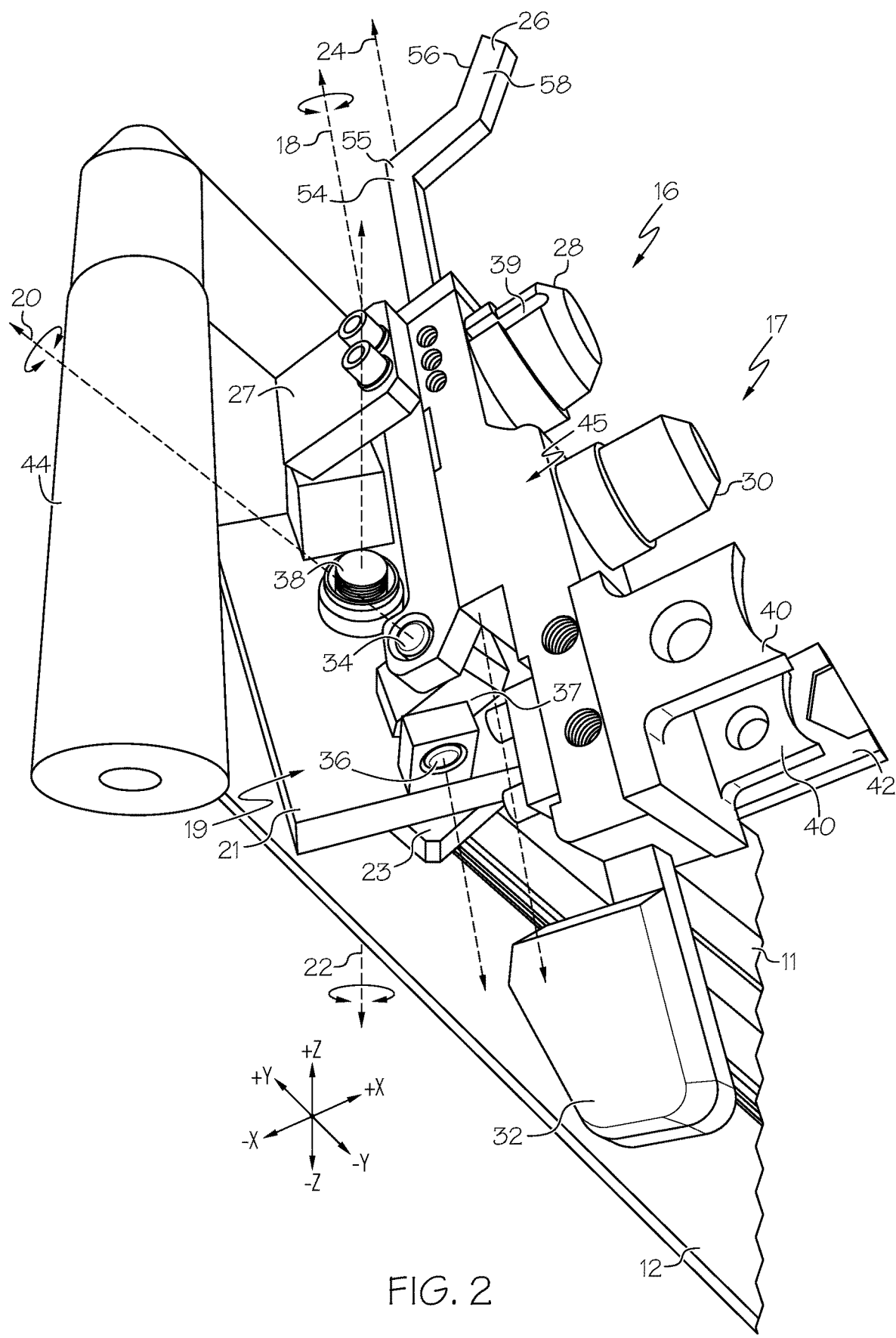
FIG. 2 schematically depicts the skate truck of FIG. 1A assembly, according to one or more embodiments shown and described herein.

Referring now to FIG. 2, portions of the articulating truck assembly 16 may be configured to rotate about one or more axes of rotation. The suspension arm engagement structure 17 may be configured to rotate up and down about a first axis of rotation 20 that is perpendicular to the longitudinal axis 24 of the suspension arm engagement structure 17. The suspension arm engagement structure 17 may also be configured to rotate in a plane about a second axis of rotation 22 that is perpendicular to the translation direction and the first axis of rotation 20. The suspension arm engagement structure 17 may also be configured to rotate side-to-side about a third axis of rotation 18 that is parallel to the longitudinal axis 24 and perpendicular to the first axis of rotation 20 and the second axis of rotation 22. The articulating truck assembly 16 may be configured to rotate about the first axis of rotation 20 at a pitch pivot connector 34, about the second axis of rotation 22 at a yaw pivot connector 38, and about the third axis of rotation 18 at a roll pivot connector 36.

Figure 3:
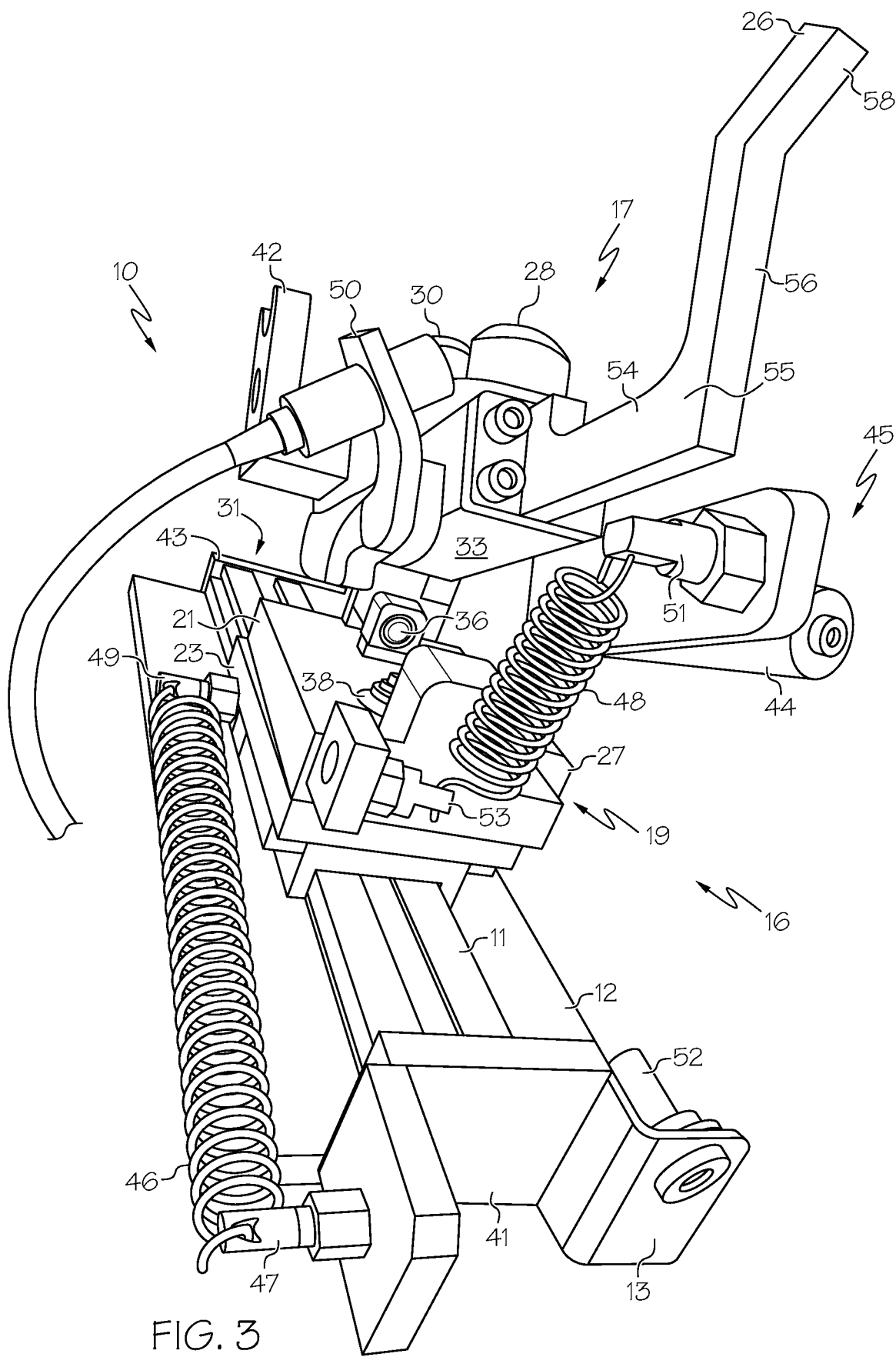
FIG. 3 schematically depicts the skate truck assembly of FIG. 1A, according to one or more embodiments shown and described herein.

The pitch pivot connector 34 may pivotably couple the suspension arm engagement structure 17 of the articulating truck assembly 16 with the lower portion 19 at the intermediate support member 21. The pitch pivot connector 34 may comprise a knuckle and pin arrangement 37 that allows the suspension arm engagement structure 17 to at least partially rotate about the first axis of rotation 20 so the suspension arm engagement structure 17 can be pivoted to match the angle of the lower rear suspension arm 100. The suspension arm engagement structure 17 may rotate between a neutral position, wherein the suspension arm engagement structure 17 lies substantially flat against the intermediate support member 21 of the lower portion 19 and a pivoted position wherein there is an angle between a bottom surface 33 of the suspension arm engagement structure 17 and the intermediate support member 21. FIG. 3 shows the suspension arm engagement structure 17 and bottom surface 33 pivoted upward from the lower portion 19.

Referring back to FIG. 2, the roll pivot connector 36 may be connected via the knuckle and pin arrangement 37 that allows the suspension arm engagement structure 17 to rotate at least partially about the third axis of rotation 18. Rotation about the third axis of rotation 18 may be provided because the plane created by the lower rear suspension arm 100 is not flat with respect to the ground beneath the vehicle 1 when the lower rear suspension arm 100 is installed. Allowing the suspension arm engagement structure 17 to rotate about the roll pivot connector 36 thus allows suspension arm engagement structure 17 to match the angle of the plane of the bottom surface of the lower rear suspension arm 100. In the particular embodiment shown in FIG. 2, the suspension arm engagement structure 17 is rotated in the clockwise direction about the third axis of rotation 18 and the suspension arm engagement structure 17 is pivoted on its side.

The yaw pivot connector 38 may couple the intermediate support member 21 of the lower portion 19 with the track receiving carriage 23. The yaw pivot connector 38 may comprise a cylindrical roller bearing or other type of rotating connection that permits rotation of the intermediate support member 21 with respect to the track receiving carriage 23. Hence, the suspension arm engagement structure 17 can rotate clockwise and counter clockwise about the second axis of rotation 22 to properly align the finger 26, inboard datum pin 28, and outboard datum pin 30 with their respective openings in the lower rear suspension arm 100. To prevent excess rotation of the intermediate support member 21 about the track receiving carriage 23, one or more of the intermediate support member 21 and the track receiving carriage 23 may comprise a rotation limiting device, such as stop 27.

The suspension arm engagement structure 17 of the articulating truck assembly 16 may further comprise a bushing seat 40, a nut locator 42, and a handle 44. The bushing seat 40 may be sized to receive a bushing 115 (FIG. 5) of an outboard bolt hole 116 of the lower rear suspension arm 100. The bushing seat 40 may be a partial arc to prevent the bushing seat 40 from binding with the bushing 115 of the outboard bolt hole 116 of the lower rear suspension arm 100 when the bushing seat 40 is placed in contact with the bushing 115 during installation of the lower rear suspension arm 100.

The nut locator 42 may be forward of the bushing seat 40 in the vehicle longitudinal direction and may comprise a half-hexagonal profile that may hold a nut in position for fastening a bolt through the outboard bolt hole 116 of the lower rear suspension arm 100 and into the nut after the lower rear suspension arm 100 is raised to the appropriate height to be coupled to the rear suspension 101. The nut locator 42 has an open top so that it can receive a nut. Generally, a hexagonal nut may be used, but embodiments are not so limited. Any type of nut for receiving a threaded fastener may be used. Accordingly, the nut locator 42 may have any shaped profile. A nut may be placed in the top of the nut locator 42 before the lower rear suspension arm 100 is raised to the ride height for fastening the lower rear suspension arm 100 to the rear suspension 101. The nut locator 42 may include one or more magnets that assist holding the nut in place.

The handle 44 may extend rearward in the vehicle longitudinal direction from the suspension arm engagement structure 17. The handle 44 may be integral with the suspension arm engagement structure 17 or be a separate piece that is joined at one or more welds, bolted, or is otherwise joined to the rearward portion 45 of the suspension arm engagement structure 17. The handle 44 may provide an article for an operator to manipulate the articulating truck assembly 16 to manually place it in alignment with the lower rear suspension arm 100 in order for the finger 26, inboard datum pin 28, and the outboard datum pin 30 to align with and enter their respective openings of the lower rear suspension arm 100. The handle 44 may comprise a rubber grip or a textured surface that increases the friction between a user's hand and the grip.

As depicted in FIG. 3, the articulating truck assembly 16 may further comprise a forward biasing spring 46, a pitch biasing spring 48, an arm proximity switch 50, and a reset proximity switch 52. The forward biasing spring 46 may be coupled to the base 12 at a forward biasing spring base attachment 47 and to the track receiving carriage 23 of the lower portion 19 at a forward biasing spring bottom plate attachment 49. The forward biasing spring 46 may reset the articulating truck assembly 16 to the forward-most position along the track 11 on the base 12 after the lower rear suspension arm 100 is installed and the suspension spring 110 is compressed.

Similarly, the pitch biasing spring 48 may be coupled to the suspension arm engagement structure 17 at a pitch biasing spring engagement structure attachment 51 and to the lower portion 19 at a pitch biasing spring carriage attachment 53. The pitch biasing spring 48 may reset the suspension arm engagement structure 17 to a neutral position (i.e., wherein the bottom surface 33 of the suspension arm engagement structure 17 is flat against the intermediate support member 21) after the lower rear suspension arm 100 is installed and the suspension spring 110 is compressed.

The skate truck assembly 10 may further include one or more proximity switches. For example, the forward extension 13 of the base 12 may comprise a reset proximity switch connection location that may hold a reset proximity switch 52 for detecting when the articulating truck assembly 16 is in a forward position in the Y-direction on the track 11. The reset proximity switch 52 may be an input to one or more other systems. For example, one or more interlocks permitting motion of the lift machine 14 or other interlock may depend on the position of the articulating truck assembly 16 along the track 11. The reset proximity switch 52 may indicate that the articulating truck assembly 16 is in a reset position and is therefore ready to install another lower rear suspension arm 100.

Additionally, the arm proximity switch connection location may be positioned on the suspension arm engagement structure 17 to hold an arm proximity switch 50 for detecting when the finger 26, inboard datum pin 28, and outboard datum pin 30 are inside their respective openings in the lower rear suspension arm 100 and the lower rear suspension arm 100 is located next to the arm proximity switch 50. This arm proximity switch 50 may also be an input to one or more other systems or interlocks. The interlocks may not clear unless the arm proximity switch 50 indicates proper installation of the suspension arm engagement structure 17 within the lower rear suspension arm 100. For example, the arm proximity switch 50 may prevent raising the platform 15 until the articulating truck assembly 16 is properly positioned with relation to the lower rear suspension arm 100.

Referring to FIG. 5, the operation of the skate truck assembly 10 will now be described. As a vehicle, such as the vehicle 1, moves along the assembly line, various components of the vehicle 1 are installed or assembled onto the vehicle 1. When the vehicle 1 enters the rear suspension assembly area, the lower rear suspension arm 100 is lowered into position by pivoting the lower rear suspension arm 100 about the pivot joint 107. The lower rear suspension arm 100 may hang in this position due to the force of gravity. The suspension spring 110 and gasket 114 are not yet installed. The articulating truck assembly 16 is in an inboard position along the track 11 because of the forward bias of the forward biasing spring 46. Initially, the bottom surface 33 (FIG. 3) of the suspension arm engagement structure 17 may be resting atop the intermediate support member 21 due to the force of gravity and the pitch biasing spring 48. This position of the articulating truck assembly 16 may be referred to as the neutral position.

The user installs a suspension spring 110 between the inside surface 112 of the lower rear suspension arm 100 and the rear suspension 101. The user places a nut within the nut locator 42. The user raises the platform 15 to an appropriate height for placing the finger 26, the inboard datum pin 28, and the outboard datum pin 30 inside the main opening 102, the inboard datum pin opening 104, and the outboard datum pin opening 106, respectively. The user manipulates the handle 44 to place the finger 26, the inboard datum pin 28, and the outboard datum pin 30 inside their respective openings, joining the suspension arm engagement structure 17 of the articulating truck assembly 16 with the lower rear suspension arm 100. The user slides the bottom coil 108 beneath the hook 58 of the finger 26.

The user raises the platform 15 by actuating the lift machine 14 (FIG. 1C), compressing the suspension spring 110, and causing the outboard end 105 of the lower rear suspension arm 100 to swing outward and upward as the lower rear suspension arm 100 pivots about the pivot joint 107. The outward swinging of the lower rear suspension arm 100 pushes the articulating truck assembly 16 outward in the vehicle lateral direction along the track 11. The interaction of the slide bearing 25 with the track 11 inhibits the slide bearing 25 from moving in the forward or rearward direction.

The lower rear suspension arm 100 is raised and the suspension spring 110 is compressed until the outboard bolt hole 116 is aligned with the outboard bolt location 118 of the rear suspension 101. The outboard bolt location 118 has an outboard bolt bushing 120. At this point, the outboard bolt bushing 120 rests within the bushing seat 40 and the nut locator 42 holds a nut aligned to receive a bolt through the outboard bolt hole 116 in the lower rear suspension arm 100 and the outboard bolt location 118. The user bolts the lower rear suspension arm 100 to the rear suspension 101 using a drill or other bolt driving mechanism.

The user then lowers the platform 15 down along the Z-axis. As the platform 15 lowers, the finger 26, the inboard datum pin 28, and the outboard datum pin 30 exit the main opening 102, the inboard datum pin opening 104, and the outboard datum pin opening 106, respectively. At this point, the only forces acting on the articulating truck assembly 16 are the pitch biasing spring 48 and the forward biasing spring 46. Therefore, the articulating truck assembly 16 will slide forward in the Y-direction on the track 11 and the suspension arm engagement structure 17 of the articulating truck assembly 16 returns to the neutral position with the bottom surface 33 of the suspension arm engagement structure 17 resting atop the intermediate support member 21 due to the force of the pitch biasing spring 48 and gravity. In this way, the articulating truck assembly 16 is reset in order to install the next suspension spring 110 and lower rear suspension arm 100 on the next vehicle in the assembly line.

The above-described skate truck assembly and associated methods for rear suspension spring compression may forego the need for reinstallation of assembly mechanism components following the installation of suspension springs and other components on the rear suspension of a vehicle. By providing a skate truck having a fixed, retractable, and articulable skate truck assembly with a suspension arm engagement structure and a track receiving carriage, the reinstallation of some assembly mechanism components may be prevented, and thus users may save time and money when assembling the rear suspension or other components of a vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Because portions of this application are directed to an assembly for manufacturing one or more portions of a vehicle along a linear assembly line, the terms as used herein will describe directions with reference to the vehicle that is being manufactured. For example, the terms "vehicle longitudinal direction" or "vehicle vertical direction" may be used herein. Because the vehicle passes linearly along the assembly line while it is being manufactured, these terms may have the equivalent meaning as if the vehicle were driving along the road. That is, vehicle longitudinal direction may refer to the forward rearward direction of the vehicle. Vehicle lateral direction may refer to an axis that passes from left to right orthogonally to the vehicle longitudinal direction. These terms are meant as an explanation of the subject matter herein and not as a limitation.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A skate truck assembly that engages a lower rear suspension arm during assembly, the skate truck assembly comprising:
   a base comprising a track that extends linearly in a translation direction;
   an articulating truck assembly slidably coupled to the track, the articulating truck assembly being moveable along the track in the translation direction, the articulating truck assembly comprising:
      a track receiving carriage that slidingly receives the track; and
      a suspension arm engagement structure having an elongated, longitudinal axis, the suspension arm engagement structure being is operatively connected to the track receiving carriage, wherein
   the suspension arm engagement structure rotates relative to the track receiving carriage along a first axis of rotation that is perpendicular to the longitudinal axis of the suspension arm engagement structure.

2. The skate truck assembly of claim 1 further comprising an intermediate support member operatively coupled to the track receiving carriage and the suspension arm engagement structure that rotates relative to the track receiving carriage along a second axis of rotation that is perpendicular to the translation direction and the first axis of rotation.

3. The skate truck assembly of claim 2, wherein the suspension arm engagement structure is operatively coupled to the intermediate support member to rotate about a third axis of rotation that is parallel to the longitudinal axis of the suspension arm engagement structure.

4. The skate truck assembly of claim 1, wherein the suspension arm engagement structure comprises a finger affixed to the suspension arm engagement structure, the finger extending outwardly from the suspension arm engagement structure to engage a suspension spring.

5. The skate truck assembly of claim 4, wherein the finger is removably affixed to the articulating truck assembly.

6. The skate truck assembly of claim 5, wherein
   the finger comprises a horizontal portion, a vertical portion, and a hook;
   the horizontal portion extends forward of the suspension arm engagement structure in the translation direction and has a forward end,
   the vertical portion extends upward in a vehicle vertical direction from the forward end of the horizontal portion, and the hook extends diagonally forward and upward from the vertical portion.

7. The skate truck assembly of claim 6, wherein the hook extends outwardly such that at least a portion of the hook extends over at least a portion of the suspension spring when the suspension spring is installed between the lower rear suspension arm and a lower rear suspension.

8. The skate truck assembly of claim 1, wherein the articulating truck assembly is biased forward in the translation direction on the track.

9. The skate truck assembly of claim 1, wherein the suspension arm engagement structure has a forward end and the forward end is biased downward about the first axis of rotation.

10. A vehicle having a lower rear suspension configured to be engaged by a skate truck assembly, the skate truck assembly comprising:
- a base comprising a track that extends linearly in a translation direction;
- an articulating truck assembly slidably coupled to the track, the articulating truck assembly being moveable along the track in the translation direction, the articulating truck assembly comprising:
  - a track receiving carriage that slidingly receives the track; and
  - a suspension arm engagement structure having an elongated, longitudinal axis, the suspension arm engagement structure being is operatively connected to the track receiving carriage, wherein
- the suspension arm engagement structure rotates relative to the track receiving carriage along a first axis of rotation that is perpendicular to the longitudinal axis of the suspension arm engagement structure.

11. The vehicle of claim 10, wherein the skate truck assembly further comprises an intermediate support member operatively coupled to the track receiving carriage and the suspension arm engagement structure that rotates relative to the track receiving carriage along a second axis of rotation that is perpendicular to the translation direction and the first axis of rotation.

12. The vehicle of claim 11, wherein the suspension arm engagement structure is operatively coupled to the intermediate support member to rotate about a third axis of rotation that is parallel to the longitudinal axis of the suspension arm engagement structure.

13. The vehicle of claim 10, wherein the suspension arm engagement structure comprises a finger affixed to the suspension arm engagement structure, the finger extending outwardly from the suspension arm engagement structure to engage a suspension spring.

14. The vehicle of claim 13, wherein the finger is removably affixed to the articulating truck assembly.

15. The vehicle of claim 14, wherein:
- the finger comprises a horizontal portion, a vertical portion, and a hook;
- the horizontal portion extends forward of the suspension arm engagement structure in the translation direction and has a forward end,
- the vertical portion extends upward in a vehicle vertical direction from the forward end of the horizontal portion, and
- the hook extends diagonally forward and upward from the vertical portion.

16. The vehicle of claim 15, wherein the hook extends far enough such that at least a portion of the hook extends over at least a portion of the suspension spring when the suspension spring is installed between the lower rear suspension arm and a lower rear suspension.

17. The vehicle of claim 16, wherein the articulating truck assembly is biased forward in the translation direction on the track.

18. A method of installing a lower rear suspension arm on a vehicle using an articulating truck assembly comprising:
- moving the articulating truck assembly along a track in a translation direction, the articulating truck assembly comprising:
  - a track receiving carriage that slidingly receives the track;
  - a suspension arm engagement structure operatively connected to the track receiving carriage that comprises a longitudinal axis; and
- pivoting the suspension arm engagement structure about a first axis of rotation that is perpendicular to the longitudinal axis of the suspension arm engagement structure to engage the lower rear suspension arm.

19. The method of claim 18, further comprising:
- pivoting an intermediate support member about a second axis of rotation to engage the lower rear suspension arm, wherein
- the articulating truck assembly comprises the intermediate support member that is operatively coupled to the track receiving carriage and the suspension arm engagement structure such that it rotates relative to the track receiving carriage about the second axis of rotation that is perpendicular to the translation direction and the longitudinal axis.

20. The method of claim 19, further comprising:
- providing the suspension arm engagement structure that has the longitudinal axis that is parallel to a third axis of rotation and is configured to rotate about the third axis of rotation; and
- rotating the suspension arm engagement structure about the third axis of rotation to engage the lower rear suspension arm.

* * * * *